I. C. FORSHEE AND C. GILMAN.
MANHOLE CONSTRUCTION.
APPLICATION FILED JUNE 9, 1917.
1,350,306.
Patented Aug. 24, 1920.
4 SHEETS—SHEET 1.
FIG. 1.
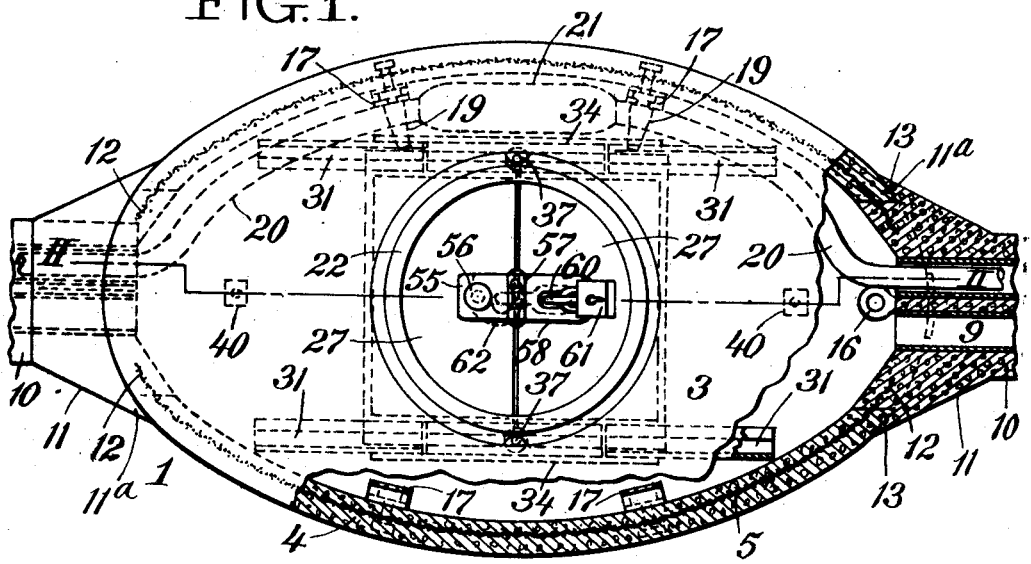
FIG. 2.
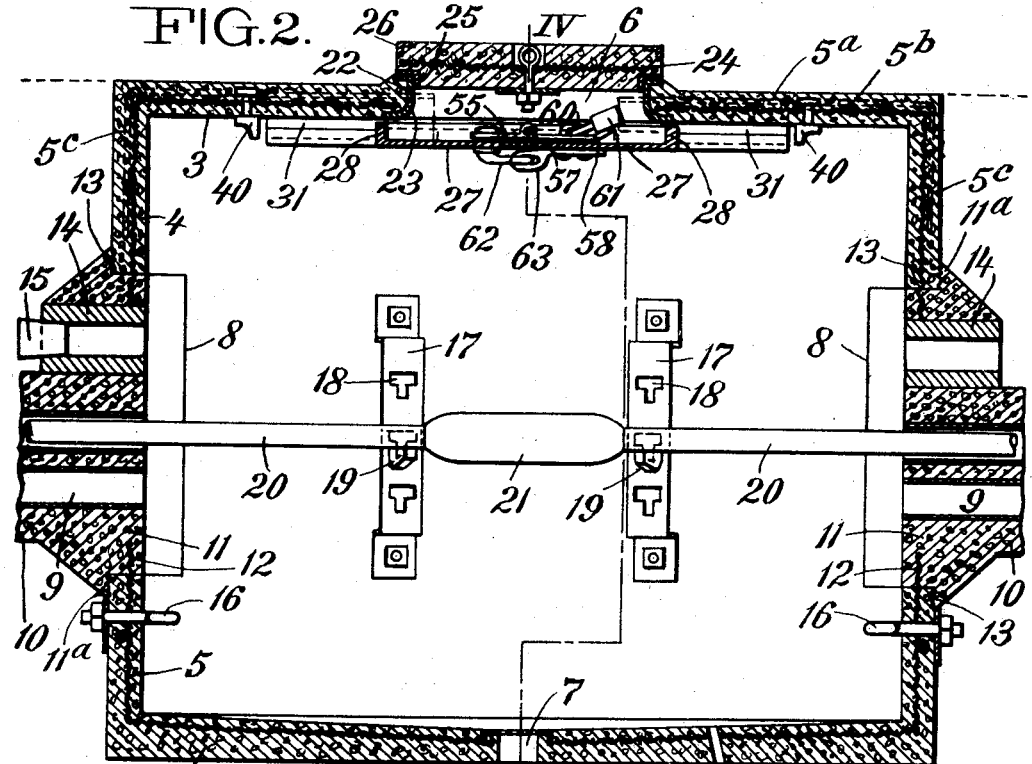
FIG. 3.
Inventors
J. C. Forshee
C. Gilman
By their Attorney
Edmund Quincy Moses

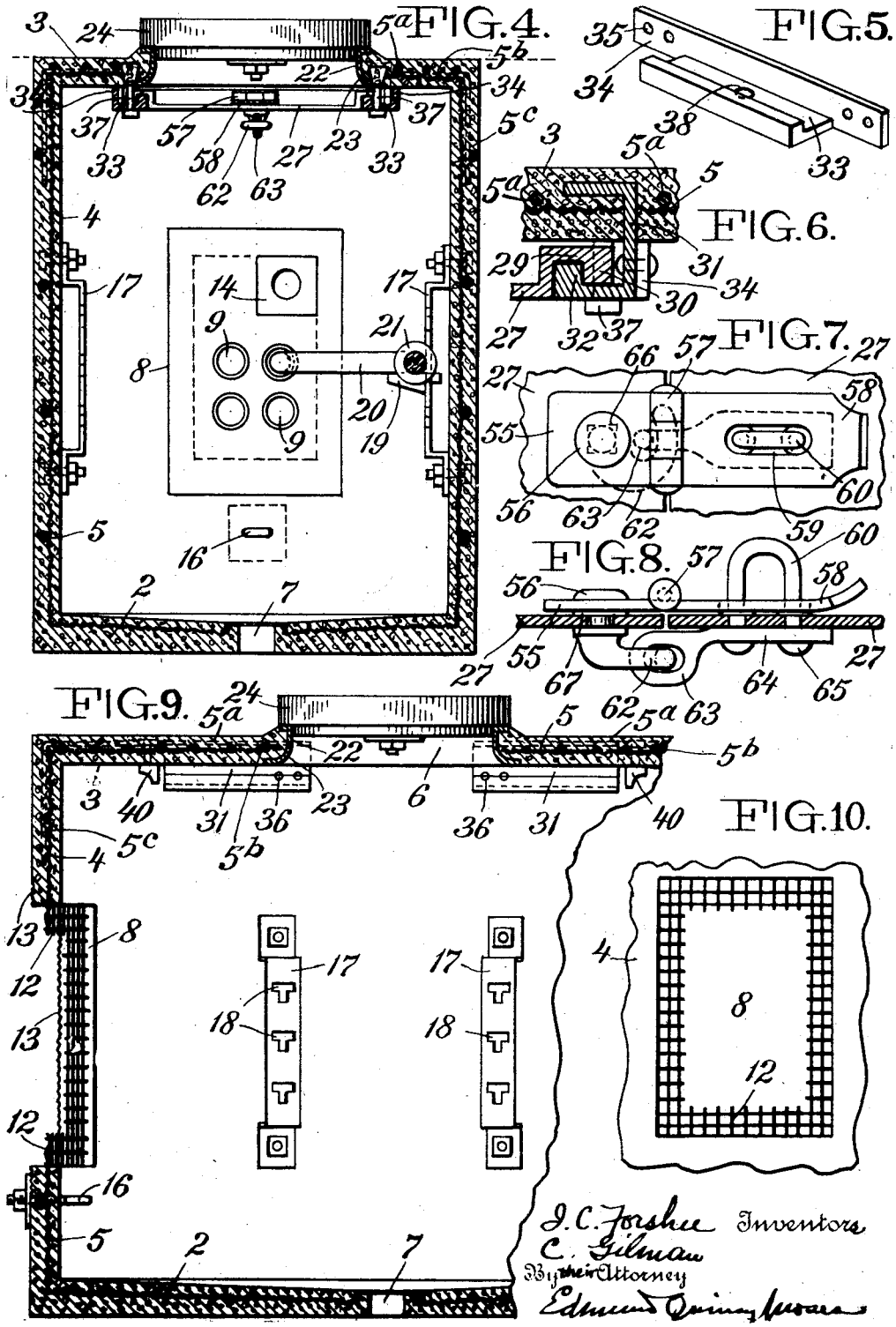

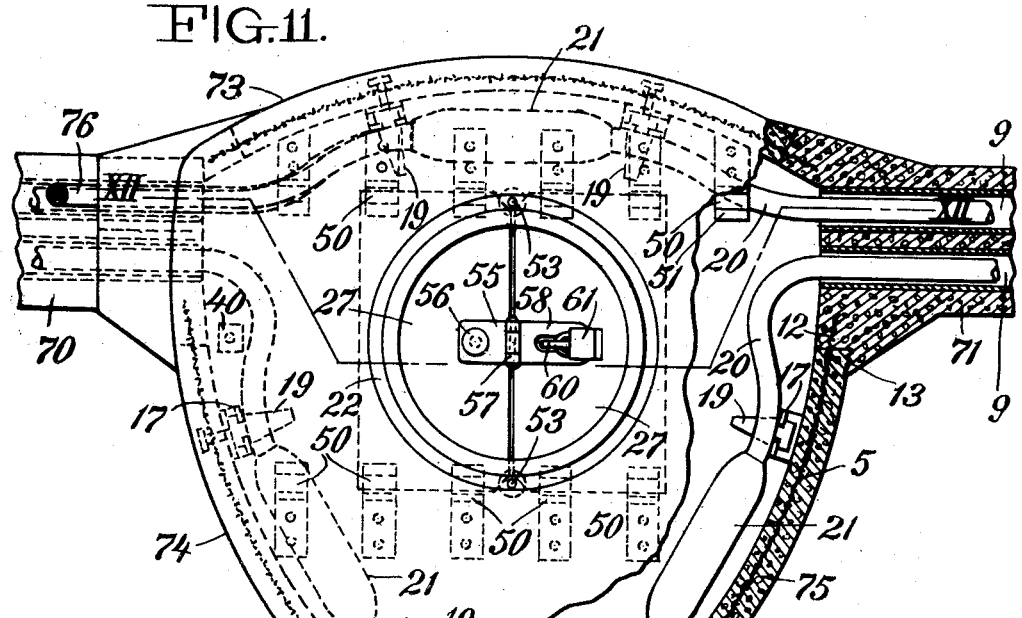
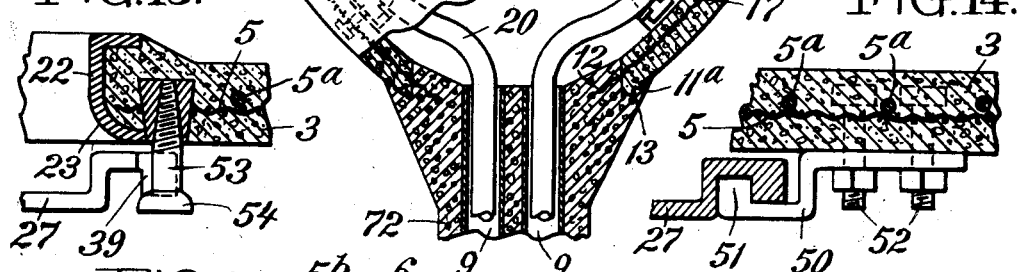
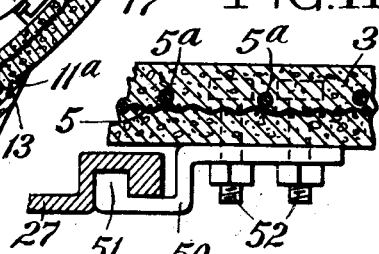
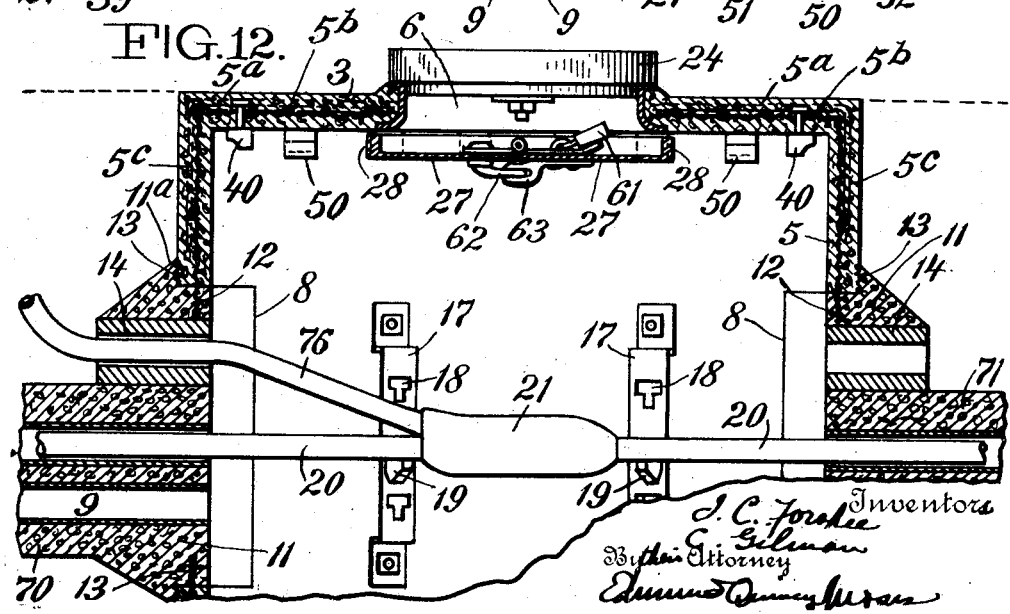

I. C. FORSHEE AND C. GILMAN.
MANHOLE CONSTRUCTION.
APPLICATION FILED JUNE 9, 1917.
1,350,306.
Patented Aug. 24, 1920.
4 SHEETS—SHEET 4.
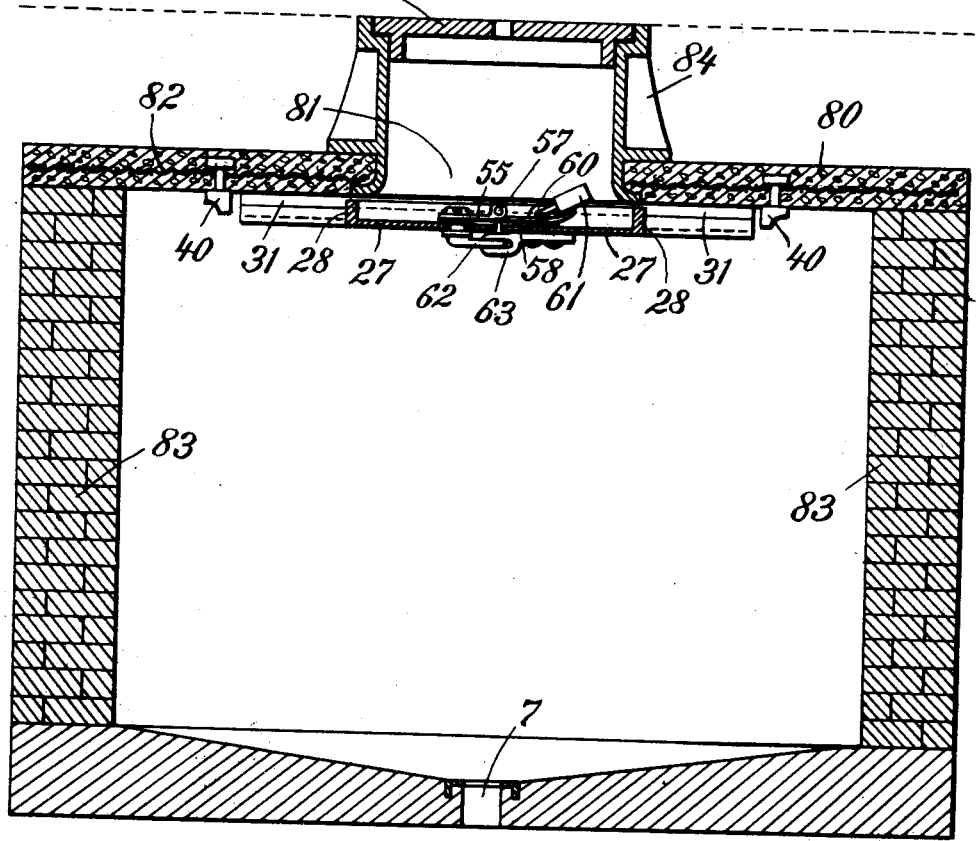
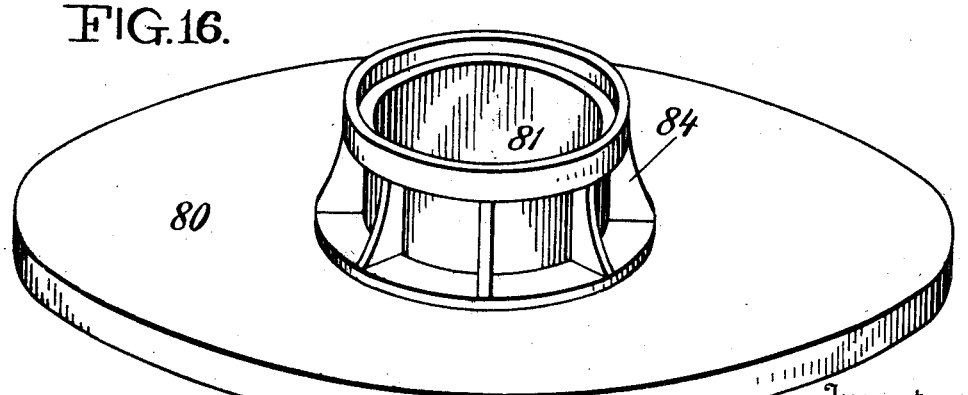

UNITED STATES PATENT OFFICE.

ISAAC C. FORSHEE, OF GERMANTOWN, PENNSYLVANIA, AND CHARLES GILMAN, OF PLAINFIELD, NEW JERSEY.

MANHOLE CONSTRUCTION.

1,350,306.    Specification of Letters Patent.    Patented Aug. 24, 1920.

Application filed June 9, 1917. Serial No. 173,908.

*To all whom it may concern:*

Be it known that we, ISAAC C. FORSHEE, a citizen of the United States, residing in the city of Germantown, county of Philadelphia, and State of Pennsylvania, and CHARLES GILMAN, a citizen of the United States, residing in the city of Plainfield, county of Union, and State of New Jersey, have invented certain new and useful Improvements in Manhole Construction, of which the following is a specification.

This invention relates to the construction of manholes, such as are employed in connection with systems of underground conduits, particularly such as are used for electrical conductors, manholes being commonly used in such conduit systems where cable sections are to be spliced, branches or taps taken off or where there are changes in the alinement of the conduit. It is desirable that such manholes should be reasonably cheap in construction; very strong and durable in order to resist the severe conditions of water, frost and pressure to which they are subjected when buried in the ground; and so designed or shaped as to admit of a satisfactory cable installation including the pulling in, forming, splicing and racking of the cable.

The present invention contemplates primarily the provision of a ready-made monolithic reinforced-concrete manhole, which may be built up and permitted to become thoroughly set and hardened at the place of manufacture, independently of weather conditions which obtain at the place of installation, and which may be readily transported as a unit to the place where used and quickly buried in the ground. In this way, the best conditions of manufacture may be secured, delays in the construction of a conduit system, while building up manholes and waiting for them to set are entirely avoided, the excavation for the manhole is open a minimum length of time which is an important factor on or along a thoroughfare or in any location during a wet season, and the manholes may be placed in advance of the conduit, thus avoiding the delays otherwise caused in the completion of the latter.

The invention also contemplates various other improvements in manhole construction, some of which are applicable to built-up as well as to monolithic manholes, these features including a construction for firmly uniting the conduit sections to the manhole; means for providing an outlet opening at the point of union between the conduit and the manhole wall; means for closing and locking the top of the manhole to prevent unlawful entry into the same; and means for facilitating the introduction and removal of the cables into and from the manhole and conduits. The particular nature and objects of these and other features of the invention will appear more clearly from the following detail description of certain preferred structures which have been chosen as illustrative of the best mode now known to us for practising the invention.

In the accompanying drawings, which form a part of this specification, Figure 1 is a plan view, partly in section, of one form of manhole embodying the invention. Fig. 2 is a vertical sectional view on line II—II of Fig. 1. Fig. 3 is a detail in sectional plan view, showing portions of the sliding doors, track and stop for limiting the inward movement of the doors. Fig. 4 is a vertical transverse section of the manhole taken on line IV—IV of Fig. 2. Fig. 5 is a perspective view of a removable rail section which may be employed. Fig. 6 is a detail sectional view showing one form of door guiding rail with a portion of the door engaging therewith. Figs. 7 and 8 are plan and vertical sectional views respectively, illustrating a hasp construction which may be employed for locking the sliding doors or covers. Fig. 9 is a vertical sectional view of a part of a manhole before the conduits are united therewith and also showing the removable rail section and sliding doors removed. Fig. 10 is a fragmentary view showing the extension of the reinforcement around a conduit opening. Fig. 11 is a plan view partly in section illustrating an improved construction of three-way manhole and also showing a modified construction for supporting the sliding doors. Fig. 12 is a vertical sectional view taken on line XII—XII of Fig. 11, the lower part of the manhole being broken away. Fig. 13 is a detail vertical sectional view of part of the manhole top taken at the stop bolt for limiting the inward movement of the doors. Fig. 14 is a similar view taken adjacent to one of the door-supporting brackets. Fig. 15 is a vertical sectional view illustrating a built-up manhole provided with a previously-prepared monolithic reinforced concrete top having the improved sliding door construction applied thereto. Fig. 16 is a perspective view of the separate top.

Referring to the drawings in detail, the numeral 1 designates the manhole which, as shown in Figs. 1 to 14, is constructed of a monolith of reinforced concrete. It comprises a bottom 2, top 3, and a side wall 4 preferably of oval or elliptical shape of the general form shown in Fig. 1. These parts are all cast or molded as a unit of concrete with a metallic reinforcement 5, of wire mesh fabric or the like, extending throughout the structure. Steel reinforcing bars are preferably employed also, particularly for reinforcing the top of the structure. As illustrated two series of bars are utilized, the bars $5^a$ of one series extending longitudinally and the bars $5^b$ of the other series extending transversely. Preferably the ends of the bars of both series are bent over and carried some distance down into the side wall of the manhole, as shown at $5^c$, so as to tie the top and wall firmly together. The manhole is constructed with the necessary openings, such as the mouth 6 for ingress or egress, the drain holes 7, and openings 8 (see Figs. 9 and 10) suitably positioned for the entrance of the conduits into the manhole. Any suitable construction of conduit may be used in connection with the manhole, the conduit being preferably laid in concrete which is molded around the ends of the conduit sections projecting into the opening 8, so as to close up the joints between the conduits and the manhole. The conduits 9 may be made from different materials such as vitrified clay, fiber, iron or steel pipe, pump log or other suitable material, laid in concrete 10 at least adjacent to the manhole, and formed or molded as indicated at 11, so as to fit the openings 8, preferably with a suitable overlap $11^a$. In order to insure a firm joint between the concrete of the conduit and the manhole wall, we preferably extend the reinforcement of the manhole wall around the opening 8, as indicated at 12, in Figs. 9 and 10, and also roughen the surface of the concrete at 13 around these openings where the manhole wall is engaged by the concrete of the overlap or shoulder $11^a$. In this way a firm bond is secured between the concrete 11 around the conduit and the manhole wall thereby producing a point practically as strong as if the whole structure were monolithic. The conduit may have any suitable number of ducts therein, four being illustrated. The opening 8 is preferably made large enough to take care of the maximum number of ducts which it may be desired to employ, the concrete 11 serving to fill up that part of the opening not required when a smaller number of ducts is utilized. The vertical dimensions of the openings are also sufficient to take care of considerable variations in the level at which the ducts enter the manhole. This permits the ducts to be given the proper pitch for drainage, etc.

In order to provide an opening for leading out branches or for other purposes, such as to facilitate the drawing out of cable sections, we preferably introduce in the concrete joint 11, at the time of joining the conduit with the manhole, a short duct section 14 such for instance as a piece of pump log. It is desirable to utilize the opening thus provided when drawing out cable sections as it permits of a more direct pull than can be obtained where the sections are pulled out of the mouth 6. While obviously it is necessary to excavate down to the top of the conduit structure, the greater ease and rapidity with which the cable sections can be pulled out and the obviation of possible injury to the cable are usually more than sufficient to compensate for the trouble of making the small excavation required. When the sections 14 are not being utilized they may, if desired, be closed in any suitable way as by plugs 15. The manhole is preferably provided with pulling-in eye-bolts 16, and suitable supports for the cables such for instance as the bracket supports 17 bolted to the side walls and provided with slots 18 adapted to receive the bracket arms 19. A pair of cables 20, 20 united by a joint 21 is shown supported on the brackets.

For the purpose of strengthening and finishing the concrete around the mouth 6, a ring 22 of cast iron or other metal is preferably inserted at the time the manhole is formed. In order to protect the cable from injury when being inserted into the ducts, the iron ring is preferably provided with a rounded guide surface 23 of substantial radius over which the cable will slide freely and without injury in case it strikes the same.

The manhole mouth is preferably closed by a suitable lid 24. As illustrated this lid is formed of reinforced concrete, strengthened with iron rings 25 and 26 and is preferably of very massive construction, weighing perhaps two or three hundred pounds. Owing to the difficulty in handling this weight, it will be seen that this lid forms a considerable impediment to unauthorized entry of the manhole. In many cases, however, it is desirable to further protect the manhole from unlawful entry, and for this purpose, we preferably employ an inner door construction so arranged that it may be locked. We have illustrated for this purpose a pair of sliding doors 27 carried in suitable guides on the underside of the manhole top.

Referring particularly to Figs. 1 to 9, it will be seen that the door sections 27 are provided with upwardly directed flanges 28 extending along the two sides and rear end of the same, the flanges at the two sides being provided with outward extensions 29, terminating in downwardly hooked portions or ribs 30 (see Fig. 6). These extensions rest upon suitable guide rails carried by the top of the manhole, one form of guide rail being shown at 31 in Fig. 6 and comprising a channel shaped member, the upper portion of which is adapted to be embedded in the concrete and the lower portion of which supports the door. The lower leg of the channel terminates in an upwardly hooked portion or rib 32 adapted to interlock with the rib 30 on the door. Two spaced rail sections 31 are provided at each side of the mouth as shown in Fig. 9, the open space between the rail sections permitting the door sections to be inserted or removed. When the doors have been inserted, the gap between the rail sections is closed by a removable section 33 of the form illustrated in Fig. 5 which fits between the fixed sections and which has extending ears 34 adapted to be bolted to the fixed sections by bolts extending through the holes 35 and 36. These removable sections are preferably further supported by means of vertical bolts 37 secured in the top of the manhole and passing through holes 38 in the removable rail sections. The bolts 37 in addition to supporting the rail sections also serve as stops for limiting the inward movement of the door sections as shown in Fig. 3. The corners of the door sections are preferably cut away as indicated at 39, so as to permit the door sections to be brought close together. Stops 40 for limiting the outward movement of the doors are preferably provided.

A modified construction for supporting the doors 27 is shown in Figs. 11 to 14. In accordance with this construction the door sections are slidingly supported upon a series of brackets 50, having hooked shaped ends 51 adapted to interlock with the ribs of the door sections and which may be secured to the manhole top in any suitable manner as by means of bolts 52. Stop bolts 53 are preferably provided for limiting the inward movement of the doors, these stops being shown as provided with rounded or mushroom shaped heads 54 over which the corners of the doors ride when closed, the inner ends of the doors being thus lifted up and pressed tightly against the underside of the manhole top so as to make a tight joint. With this construction, it will be seen that the doors will slide in and out just as on the rails and may be applied or removed by unbolting a sufficient number of brackets 50. Any other suitable sliding or movable door construction may be employed.

For locking the sliding doors closed, any suitable construction may be utilized, a preferred construction for this purpose being illustrated in detail in Figs. 7 and 8. In accordance with this construction, a hasp is provided, the base leaf 55 of which is attached by means of a swivel stud 56 with one of the door members. This base leaf has hinged thereto by a hinge 57, a movable leaf 58 having a slot 59 therein. Fastened to the other door member is a staple 60 adapted to project through the slot in the hinge leaf and to receive a padlock 61, as shown in Figs. 1 and 2. As a further securing means, the swivel stud 56 is shown as provided on its lower end with a curved or hook-shaped bolt 62 which is adapted to engage with an eye 63 formed on a plate 64 attached to the underside of the other door member in any convenient manner as by means of the riveted-over ends 65 of the staple 60. The portion of the swivel stud 56 which passes through the hasp member 55 is preferably squared as indicated at 66 in the dotted lines in Fig. 7, so that the hasp may be utilized as a means for rotating the stud in the door member. A washer 67 is preferably employed to space the hasp member from the upper surface of the door so as to facilitate the rotation of the stud and prevent the hasp from making a mark on the door which might indicate to unauthorized persons how the device was to be operated. With this construction, it will be seen that a double locking means is provided so that it would be necessary for an unauthorized person, in order to open the doors, to first break open the padlock and then to manipulate the hasp in the proper manner by rotating the same a quarter of a turn in the right direction to withdraw the bolts 62 from the eye 63. There would be nothing to indicate to one not familiar with the construction the manner of withdrawing this bolt, or, in fact, what it was that prevented the opening of the doors.

In Figs. 11 and 12, we have shown a form of manhole adapted to receive conduits from three directions. The three conduits are shown at 70, 71 and 72, and the manhole has three curved wall sections 73, 74 and 75, which are of sufficient length to carry a pair of bracket supports 17 spaced far enough apart to receive between them a cable joint 21. With this construction, it is possible to carry the cables through the manhole between any pair of ducts without obstructing the central part of the manhole in such a way as to prevent ready access to the various cables therein. We have also shown in these figures a branch cable 76 led out through one of the short duct sections 14.

In Figs. 15 and 16 we have shown a novel form of manhole top comprising a reinforced monolithic slab of concrete 80 having a mouth 81 and containing the metal reinforcement 82. This concrete top is adapted to be constructed at any convenient point and carried to the place where the manhole is to be located, the body of the manhole being built up in any desired or usual manner such as out of brick as indicated at 83. The body of the manhole having been completed, the top may be placed when the whole construction is completed and may be covered over with earth, if desired. This construction is very desirable especially for street work as it avoids the delay incident to the molding and setting of a concrete top in position, thereby minimizing the time during which the street surface is obstructed. The top 80 is shown as provided with locked sliding doors 27 and in this instance is also shown as provided with a cast iron neck 84 and lid 85, such as are commonly used for street work. Obviously this construction of neck and lid may be utilized with the complete monolithic manhole construction described above or the monolithic top shown in this figure may be provided with a flush top and concrete lid as shown in Fig. 2.

The construction of the manhole described as a monolith of reinforced concrete capable of transportation to the place of use as a finished article is particularly desirable as it enables the best possible conditions to be obtained for manufacture irrespective of local conditions which might impair or delay the work if carried on at the place of installation. The concrete can also be permitted to season thoroughly before the manholes are sent out. Furthermore, the work of laying the conduit and placing the manhole can be completed with the utmost expedition and the excavations remain open for the shortest possible time. The manholes may, if desired, be made to incorporate waterproofing material or the finished manhole may be treated in any suitable manner for waterproofing purposes.

The elliptical shape of manhole described is particularly advantageous as it provides the maximum space for the forming and splicing of the cable, for the minimum external dimensions. The elliptical shape is also a form in which the reinforcement can be easily incorporated and economically used and is correct from the standpoint of mechanical strength. These features result in making possible the construction of a manhole of the character described, which while strong and durable, is not excessively large and is relatively light in weight, so that it may be economically shipped and readily placed in position.

It is to be understood that the constructions particularly described herein and shown in the accompanying drawings are chosen for purposes of illustration and that the invention is not limited to such specific forms but that we intend to cover our invention in whatever form its principle may be embodied.

What we claim is:

1. As a new article of manufacture, a monolithic reinforced concrete manhole having a continuously curved side wall acting as an arch when subjected to pressure from any lateral direction, said manhole being manufactured above ground and adapted to be transported and set in position as a unit, and having a conduit opening in the side wall thereof and having a pulling-in bolt set in the side wall opposite to said conduit opening.

2. As a new article of manufacture, a monolithic concrete manhole of sufficient strength to be manufactured above ground and adapted to be transported and set in position as a unit, said manhole having an elliptical side wall reinforced with a continuous web of wire fabric or the like, an opening being left in the concrete at an end of the manhole to provide a conduit opening, the reinforcing fabric being cut out to form an opening of less area than the opening in the concrete.

3. The combination of a monolithic concrete manhole manufactured as a unit and adapted to be transported and set in position after completion, said manhole being constructed with a side wall of substantially elliptical cross section having duct openings at opposite ends of the major axis left therein at the time of manufacture, said side wall being reinforced with a mesh fabric which has openings formed therein of less area than the openings left in the concrete, whereby the reinforcement extends partly into said openings, said manhole being combined with conduits communicating with said openings, said openings being of greater vertical dimensions than the vertical dimensions of said conduits so as to take care of the pitch of said conduits, said conduits being united to said manhole by concrete cast around the end portions of said conduits so as to close the openings in the manhole wall around the conduits and interlock with the portions of the reinforcing material extending into the duct openings.

4. A monolithic reinforced concrete manhole having a reinforced bottom of sufficient strength to form a foundation for the manhole whereby the manhole may be made at one place and transported and set in position as a unit without the necessity for the construction of a local foundation, said manhole having a metallic reinforcing web of mesh fabric or the like extending throughout the side wall and top wall thereof and having reinforcing bars extending through the top wall, said bars being downwardly bent at their ends so as to extend into the upper part of the side wall of the manhole and assist in tying the top and side wall together.

5. As a new article of manufacture, a reinforced concrete manhole of substantially elliptical cross section having a reinforced bottom of sufficient strength to form a foundation for the manhole, whereby the manhole may be made in one place and transported and set in position as a unit without the necessity for the construction of any local foundation, said manhole having a concrete top in which is formed a mouth, and a metallic ring set in the concrete around said mouth and having flanges overlapping the concrete at the top and bottom of the mouth, the body of the ring forming a substantially smooth vertical side wall for the mouth, and the flange at the bottom of the ring merging into the body of the ring in a smooth curve of substantial radius so as to permit a cable to be drawn over said surface without injury.

6. As a new article of manufacture, a monolithic reinforced concrete manhole of substantially elliptical cross section having a reinforced bottom of sufficient strength to form a foundation for the manhole whereby the manhole may be made at one place and transported and set in position as a unit without the necessity for the construction of any local foundation.

7. In manhole construction, the combination of a manhole top having a mouth therein, doors for closing said mouth slidingly mounted on the underside of said top, means for locking said doors, and a lid adapted to cover said mouth.

8. In manhole construction, the combination of a manhole top having a mouth therein, a pair of metallic door sections slidingly supported on the underside of said top, stops for limiting the movement of said door sections when moved to closed position and means for locking said door sections together.

9. In manhole construction, the combination of a manhole top having a mouth, therein, a pair of metallic door sections slidingly supported on the underside of said top, stops for limiting the movement of said door sections when moved to closed position and means for locking said door sections together, said locking means comprising a hasp pivotally supported on one section and adapted to engage with a staple on the other section and a bolt operatively connected with said hasp and adapted to be actuated by lateral pivotal movement thereof to engage or disengage an eye on the second door section.

10. In manhole construction, the combination with the reinforced concrete manhole top having a mouth therein, of rail sections carried by said top and partially embedded in the concrete thereof, portions of said rail sections depending below the undersurface of the top and doors for closing said mouth slidingly mounted on the depending portions of said rail sections.

11. In manhole construction, the combination with the reinforced concrete manhole top having a mouth therein, of rail sections carried by said top and partially embedded in the concrete thereof, portions of said rail sections depending below the undersurface of the top, and doors for closing said mouth slidingly mounted on the depending portions of said rail sections, said rail sections and doors having interlocking marginal ribs.

12. In manhole construction, the combination with the reinforced concrete manhole top having a mouth therein, of rail sections carried by said top and partially embedded in the concrete thereof, portions of said rail sections depending below the undersurface of the top and doors for closing said mouth slidingly mounted on the depending portions of said rail sections, said rail sections and doors having interlocking marginal ribs, and stop for limiting the movements of said doors in both directions.

13. In manhole construction, the combination of a manhole having a conduit opening in the side wall thereof, a conduit entering said opening, a mass of concrete formed around said conduit and filling up said opening around the same and a short duct section introduced into said concrete adjacent to said conduit.

ISAAC C. FORSHEE.
CHARLES GILMAN.